Figure 2:
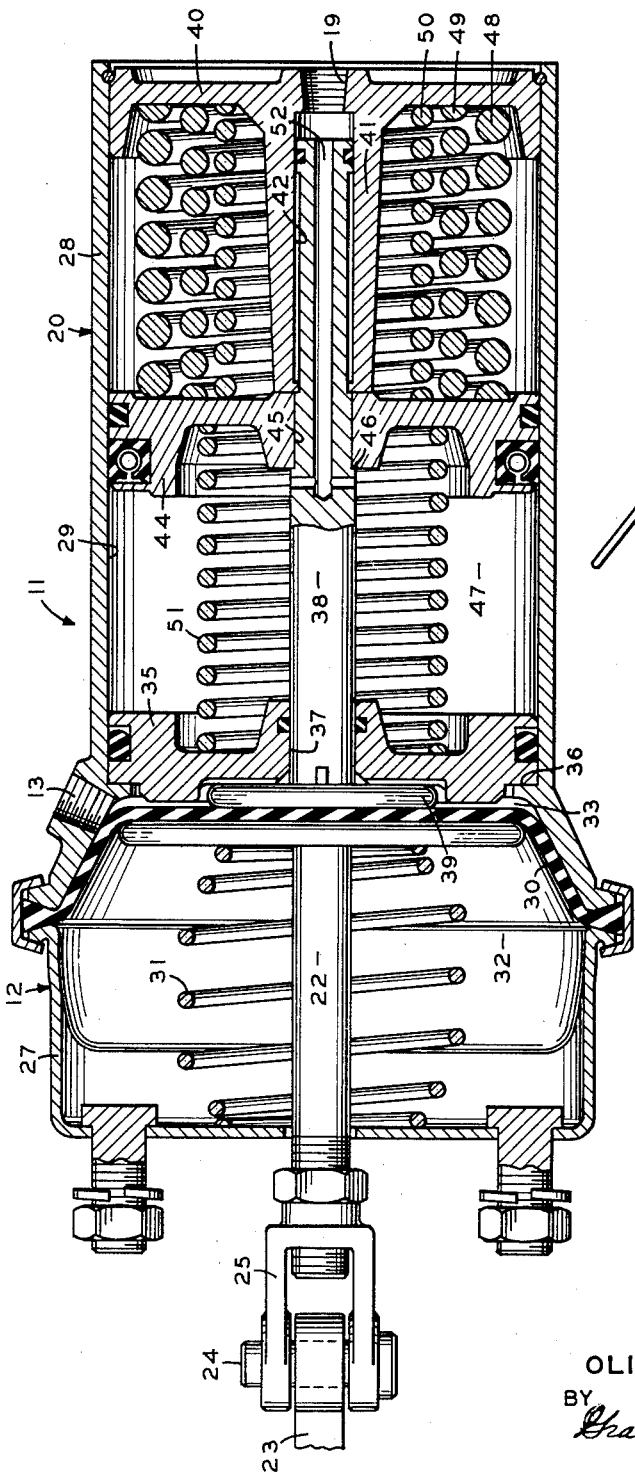

April 7, 1964     O. B. CRUSE     3,127,818

BRAKE OPERATING MECHANISM

Filed July 31, 1961

INVENTOR
OLIVER B. CRUSE
BY
*Gravely, Lieder & Woodruff*
ATTORNEY

United States Patent Office 3,127,818
Patented Apr. 7, 1964

3,127,818
BRAKE OPERATING MECHANISM
Oliver B. Cruse, Florissant, Mo., assignor to Wagner Electric Corporation, St. Louis, Mo., a corporation of Delaware
Filed July 31, 1961, Ser. No. 128,030
16 Claims. (Cl. 92—63)

This invention relates to brake systems and more particularly to improvements in safety and parking brake mechanisms.

In the past many brake operating mechanisms have been devised for automatically energizing wheel brake assemblies by a spring force as a safety measure in the event the fluid pressure in the brake system dropped below a predetermined value. Safety or parking brake power cylinders in brake systems conventionally are responsive to an operator applied fluid pressure to energize the brake system in normal operation and are automatically responsive to a loss in fluid pressure below the predetermined amount to apply a spring force for energizing the wheel brake assemblies. However, an undesirable feature of prior brake systems is that the spring force and operator applied fluid pressure act on the wheel cylinder actuating mechanism in concert if applied simultaneously whereby the additive forces frequently attain a magnitude great enough to damage the component parts of the wheel brake assemblies as well as other parts of the brake system associated therewith.

The principal object of the present invention is to provide a brake operating mechanism for a parking brake power cylinder which overcomes the undesirable features and disadvantages of prior brake systems. Another object of the invention is to provide a parking brake power cylinder which will not be actuated by additive spring and operator forces above a predetermined value and thereby obviates the possibility of damaging the wheel brake assemblies and other component parts of the brake system. It is a further object to provide a simple and inexpensive brake system including a safety and parking brake power cylinder that is positive acting. These and still other objects and advantages will become more apparent hereinafter.

Briefly, the invention is embodied in a brake system comprising a vehicle brake mechanism, a fluid pressure source, power means for actuating the vehicle brake mechanism in response to operator metered pressure fluid from the source, first and second piston means normally biased to opposed inoperative positions by pressure fluid from the source, the first piston means having a working end thereof urged by spring means toward an operative position actuating the vehicle brake mechanism, and the second piston means being responsive to operator metered pressure fluid from the source to oppose the spring force when the first piston means is in operative position. The invention also consists in the parts and in the combinations and arrangements of parts hereinafter described and claimed.

Figure 1:
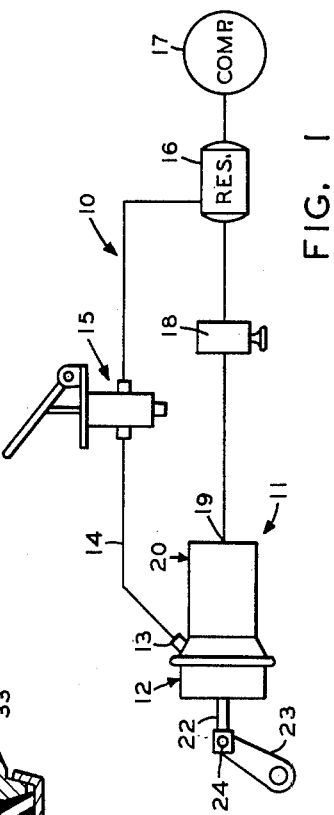

In the drawings which accompany the specification and wherein like numerals refer to like parts wherever they occur:

FIG. 1 is a diagrammatic view showing a brake system embodying the invention, and FIG. 2 is a cross-sectional view of a brake operating mechanism embodying the invention.

Referring now to the simplified diagrammatic brake system 10 shown in FIG. 1, a brake actuating mechanism 11 has a power portion 12 with an inlet 13 coupled by conduit 14 through an operator controlled application valve 15 to a fluid pressure source, such as reservoir 16 and air compressor 17. The reservoir tank 16 is also connected through a conventional operator controlled push-pull type venting valve 18 to the inlet 19 of an emergency portion 20 of the brake actuating mechanism 11. As will become more apparent hereinafter, the brake actuating mechanism 11 is adapted to move a push rod 22 to the left in the drawings for actuating a vehicle brake (not shown) through lever 23 pivoted at 24 to the clevis 25 of the push rod 22. The vehicle brake member is of conventional construction and its disclosure is not believed to be essential to an understanding of the present invention.

Referring now to FIG. 2, the brake actuating mechanism 11 includes a power portion housing or end plate 27 and an emergency portion housing or cylinder 28, the latter having a bore 29 and a diaphragm or actuator 30 of typical construction being secured between the housings 27 and 28 in a well-known manner. The push rod 22 has one end normally biased into engagement with the diaphragm 30 by a return spring 31, and the other or working end of the push rod 22 extends out of the housing 27 and is connected by the clevis 25 to the brake applying lever 23 as described. It will be noted that the chamber 32 defined by the housing 27 and diaphragm 30 is vented to atmosphere and that the other side of the diaphragm forms a power chamber 33 connected through inlet 13 and conduit 14 to the application valve 15 through which pressure fluid is metered from the reservoir 16 for moving the diaphragm 30 to the left in FIG. 2 to actuate the vehicle brake member during normal operation.

A first piston or wall member 35 is slidably positioned in the housing bore 29 and normally abuts an annular shoulder 36 formed on the housing 28 to form one end of the power chamber 33. It is therefore apparent that an expansible power chamber 33 has been formed between the first piston 35 and the diaphragm 30. The piston 35 is provided with a central bore 37 and a piston rod or extension 38 extends through the bore 37 and has a working end or pad 39 in juxtaposition with the diaphragm 30 for actuation thereof under emergency conditions as will be described presently. The housing 28 has a fixed end wall 40 having a central sleeve member 41 with a bore 42 slidably receiving the other end of the piston rod 38.

A second piston 44 is slidable in the housing bore 29 and has a bore 45 through which the guide end of the piston rod 38 extends, the piston rod 38 being stepped to form an annular shoulder 46 against which the second piston is normally in abutment. The first and second pistons 35 and 44 form an expansible emergency or second pressure chamber 47, and are shown in FIG. 2 in the expanded position thereof during normal operating conditions. A plurality of compression springs 38, 49 and 50 exert a predetermined force between the end plate 40 and the second piston 44 resiliently urging the second piston toward the first piston 35 and diaphragm 30, and another spring 51 may be provided between the first and second pistons 35 and 44 to adjust the effective forces on the pistons 35 and 44 and to urge the former to its inoperative position against the shoulder 36 during normal operation of the brake actuating mechanism 11. Passage means 52 are formed in the piston rod 38 to establish communication between the second pressure chamber 47 and the inlet 19 formed in the end plate 40, the inlet being connected to the reservoir 16 through the push-pull venting valve 18.

In normal operation of the brake actuating mechanism 11, the component parts thereof are normally positioned as shown in FIG. 2 when fluid pressure in the storage reservoir 16 and the second pressure chamber 47 and acting on the effective area of the second piston 44 creates a force great enough to overcome the forces of the springs 48, 49 and 50 thereby seating the second piston 44 against the end of the sleeve member 41, and similarly acting on the first piston 35 to maintain it against the abutment 36. During a normal service braking application, fluid pressure is metered through the application valve 15 into the power chamber 33 and acts on the effective area of the diaphragm 30 creating a force which moves the diaphragm and the push rod 22 leftwardly to apply the vehicle brakes. When the fluid pressure is released from the power chamber 30 at the end of the braking effort, the return spring 31 moves the diaphragm to its normally inoperative position as shown in FIG. 2.

In an emergency situation, such as when the fluid pressure in the reservoir 16 is lost or greatly reduced due to a break in the lines or the like, the fluid pressure in the second pressure chamber 47 is similarly reduced so that the forces of springs 48, 49 and 50 move the second piston 44 leftwardly in the housing bore 29 to actuate the piston rod 38 and mechanically operate the diaphragm 30 to apply the vehicle brakes. The brakes will remain applied under the forces of the compression springs until fluid pressure in the second pressure chamber 47 is restored to a magnitude, when acting on the effective area of the second piston 44, creating an effective force sufficient to overcome the spring force acting in opposition thereto. At such time the piston 44 will be moved to its normally inoperative position in the bore 29, as shown in FIG. 2, thereby compressing the springs 48, 49 and 50 and permitting the piston rod 38 to be returned to its inoperative position by reason of the return spring 31.

During an emergency actuation of the vehicle brakes, any fluid pressure metered into the power chamber 33 through the application valve in a service braking applicaton, will not create a force on the diaphragm that is additive to the force exerted by the compression springs 48, 49 and 50. This is due to the fact that the first piston 35 is slidable in the bore 29 and fluid pressure in the power chamber 33 will act on the first piston 35 and apply the effective force thus created in opposition to the spring applied force on the second piston 44 and thereby tend to neutralize the effect of the operator applied pressure.

In a brake system 10 employing a venting valve 18 between the emergency inlet 19 and the storage reservoir 16, the second pressure chamber 47 may be vented to atmosphere by manual operation of the valve, whereby the present brake actuating mechanism 11 can be used as a parking brake wherein the vehicle brakes are set or applied under the compressive force of the springs 48, 49 and 50.

It is now apparent that the present invention provides a simple brake actuating mechanism which is positive acting under emergency conditions created by loss of pressure fluid in the reservoir or brake lines and which also may be utilized as a parking brake. It is also apparent that the safety features of the present brake actuating mechanism protect the vehicle brakes and parts thereof against unusually high actuating forces which heretofore have caused distortion or breakage.

The present invention is intended to cover all changes and modifications of the present disclosure which will be obvious to those skilled in the art, and the invention is limited only by the claims which follow.

What I claim is:

1. A brake system comprising a vehicle brake mechanism, a fluid pressure source, and an operating mechanism including power means for actuating said vehicle brake mechanism in response to operator metered pressure fluid from said source, first and second piston means normally biased to opposed inoperative positions by pressure fluid from said source, said first piston means having a working end thereof juxtaposed with said power means, spring means urging said first piston means toward an operative position for moving said power means to actuate said vehicle brake mechanism, means forming an abutment for said second piston means defining the inoperative position thereof, and said second piston means being responsive to operator metered pressure fluid from said source to oppose said spring means when said first piston means is in operative position.

2. A brake system comprising a vehicle brake mechanism, a fluid pressure source, power means for actuating said vehicle brake mechanism in response to operator metered pressure fluid from said source, first and second piston means normally biased to opposed inoperative positions by pressure fluid from said source, a piston rod engaged by said first piston means and having a working end adapted to actuate said vehicle brake mechanism, spring means of preselected force urging said first piston means toward an operative position for moving said piston rod to actuate said vehicle brake mechanism, means forming an abutment for said second piston means defining the inoperative position thereof, and said second piston means being responsive to operator metered pressure fluid from said source to oppose said spring means when said first piston means is in operative position.

3. A brake system comprising a vehicle brake mechanism, a fluid pressure source, and an operating mechanism including power means including a flexible diaphragm responsive to operator metered pressure fluid from said source for actuating said vehicle brake mechanism, first and second piston means normally biased to opposed inoperative positions by pressure fluid from said source, a piston rod engaged by said first piston means and having a working end thereof in juxtaposition with said diaphragm, spring means biasing said first piston and piston rod toward a diaphragm operating position for actuating said vehicle brake mechanism when said fluid pressure from said source is below a predetermined magnitude, means forming an abutment for said second piston means adjacent to said power means and defining the inoperative position of said second piston means, and said second piston means being adapted to move toward said first piston means in opposition to said spring means in response to operator metered pressure fluid from said source when said first piston means is in diaphragm operating position.

4. A brake system comprising a vehicle brake mechanism, a fluid pressure source, a power cylinder having a power chamber connected through operator controlled means to said pressure fluid source, brake actuating means responsive to operator controlled pressure fluid in said power chamber for operating said vehicle brake mechanism, and emergency control means for actuating said vehicle brake mechanism independently of said operator controlled pressure fluid, said emergency control means including a second chamber having a bore with an abutment adjacent to said power chamber and being in communication with said fluid pressure source, a piston slidable in said bore and normally abutting said abutment to define a common wall between said power and second chambers, another piston slidable in said bore and being spring loaded in a direction toward said first piston and power chamber, a piston rod engaged by said other piston and having a working end in said power chamber for operating said brake actuating means, the fluid pressure in said second chamber acting on the effective area of said other piston to overcome the spring force thereon during normal operation whereby said other piston is inoperative to move said piston rod to a brake actuating position, said other piston being movable in response to a reduction in fluid pressure in said second chamber below a predetermined magnitude to operate said piston rod and brake actuating means, and said first piston being movable in opposition to said spring force in response to operator controlled pressure fluid from said source when said other piston is in brake actuating position.

5. A system according to claim 4 in which said first and other pistons are biased apart by other spring means.

6. A system according to claim 4 in which valve means are provided for selectively venting said second chamber to atmosphere.

7. In a brake operating mechanism of the type described, a power chamber having power means responsive to operator metered fluid pressure from a source for normally effecting brake actuation, resiliently urged means normally rendered inoperative by fluid pressure from the source and being movable toward said power means upon a predetermined loss of fluid pressure acting thereon, and movable piston means disposed between said power means and resiliently urged means, means for normally maintaining said piston means in fixed position adjacent to said power means, said piston means being urged to move in response to said operator metered fluid pressure in said power chamber for urging said resiliently urged means away from said power means during predetermined loss of the fluid pressure acting on said resiliently urged means.

8. A friction device operating mechanism comprising a housing having a pair of expansible chambers therein, movable wall means between said chambers, a pair of resiliently urged means opposing expansion of said chambers, one of said resiliently urged means having a working end exteriorly of said housing, the other of said resiliently urged means having an end in one of said chambers for driving engagement with said one resiliently urged means, means for introducing fluid pressure into said one chamber, said one resiliently urged means being normally movable in response to fluid pressure in said one chamber to energize said working end, means for introducing fluid pressure into the other of said chambers, said movable wall means being normally urged into engagement with said housing in response to fluid pressure in said other chamber, said other resiliently urged means being movable in a working direction in response to reduction of the fluid pressure in said other chamber to a predetermined amount to drive said one resiliently urged means and energize said working end, said movable wall being responsive to fluid pressure in said one chamber to oppose movement of said other resiliently urged means in the working direction when the fluid pressure in said other chamber is reduced to the predetermined amount.

9. A friction device operating mechanism comprising a housing having a pair of expansible chambers therein, means including spring means opposing expansion of one of said chambers, actuator means opposing expansion of said other chamber and having a working end exteriorly of said housing, an abutment on said housing between said chambers, movable wall means between said chambers and normally contacting said abutment, extension means on said first named means and normally engaged with said actuator means in said other chamber, means for introducing fluid pressure into said other chamber, said actuator means being movable in response to fluid pressure in said other chamber to energize said working end, other means for introducing fluid pressure into said one chamber, said spring means concertly urging said first named means and extension means in a working direction when the fluid pressure in said one chamber is less than a predetermined amount to energize the working end of said actuator means, and said movable wall being movable when the fluid pressure in said other chamber exceeds that in said one chamber to oppose movement of said first named means in the working direction.

10. A friction device operating mechanism comprising a cylinder having an abutment, a wall movably mounted in said cylinder and normally engaging said abutment, a first actuator movably mounted in said cylinder on one side of said wall and defining therewith a first expansible chamber, a second actuator movably mounted in said cylinder on the opposite side of said wall and defining therewith a second expansible chamber, said second actuator having a working portion extending into said first chamber and adapted for engagement with said first actuator, a working end on said first actuator exteriorly of said cylinder, means for introducing fluid pressure into said second chamber, spring means urging said second actuator in a working direction to engage the working portion thereof with said first actuator and energize said working end when the fluid pressure in said second chamber is less than a predetermined amount, means for introducing fluid pressure into said first chamber, said first actuator being movable in response to fluid pressure in said first chamber to energize said working end, and said wall being movable toward said second actuator in response to fluid pressure in said first chamber greater than that in said second chamber to oppose the force of said spring means.

11. A friction device operating mechanism comprising a cylinder, an end plate housing, diaphragm means clamped between said cylinder and housing, a push rod connected with said diaphragm means and having a working end exteriorly of said housing, a pair of piston means slidable in said cylinder, a first expansible chamber between said pair of piston means, a second expansible chamber between one of said piston means and said diaphragm means, means for limiting movement of said one piston means toward said second chamber, extension means on the other of said piston means extending into said second chamber, means for introducing fluid pressure into said second chamber, said diaphragm means being movable in response to fluid pressure in said second chamber to actuate said push rod and energize the working end thereof, resilient means urging said other piston means in a working direction to engage said extension means with said diaphragm to actuate said push rod and energize the working end thereof, said one piston means being movable toward said other piston means when the fluid pressure in said second chamber exceeds that in said first chamber to oppose the force of said resilient means.

12. A friction device operating mechanism comprising a cylinder, an end plate housing, diaphragm means clamped in sealing engagement between said cylinder and end plate housing, a push rod connected with said diaphragm means and having a working end exteriorly of said end plate housing, a pair of piston means slidable in said cylinder, a first expansible chamber in said cylinder between said diaphragm means and one of said piston means, means for limiting movement of said one piston means toward said first chamber a second expansible chamber in said cylinder between said pair of piston means, an aperture in said one piston means, extension means on the other of said piston means slidable in said aperture and juxtaposed with said diaphragm means in said first expansible chamber, means for introducing fluid pressure into said first expansible chamber, said diaphragm means being movable in response to fluid pressure in said first expansible chamber to actuate said push rod and energize the working end thereof, resilient means biased between said cylinder and said other piston means, means for introducing fluid pressure into said second expansible chamber, said resilient means being extendable to effect concert movement of said other piston means and diaphragm means to actuate said push rod and energize the working end thereof when the fluid pressure in said second expansible chamber is less than a predetermined amount, and said one piston means being movable toward said other piston means to oppose the force of said resilient means when the fluid pressure in said first expansible chamber exceeds that in said second expansible chamber.

13. A friction device operating mechanism comprising a cylinder, an end plate housing, diaphragm means clamped in sealing engagement between one end of said cylinder and said end plate housing, a push rod connected with said diaphragm means and having a working end extending exteriorly of said end plate housing, a pair of relatively movable piston means slidable in said cylinder, a first expansible chamber in said cylinder between said diaphragm means and one of said piston means, abutment means on said cylinder for limiting movement of said one piston means toward said first expansible chamber, a second expansible chamber in said cylinder between said pair of piston means, an aperture in said one piston means, extension means on said other piston means slidable in said aperture and normally engaged with said diaphragm means in said first expansible chamber, resilient means biased between the other end of said cylinder and said other piston means, means for introducing fluid pressure into said second chamber, said one piston means normally being positioned agianst said abutment means in an inoperative position in response to fluid pressure in said second chamber and said other piston means being movable to an inoperative position against the compressive force of said spring means in response to fluid pressure in said second chamber above a predetermined amount, said spring means being extendable to move said other piston means in a working direction toward an operative position when the fluid pressure in sad second chamber is less than the predetermined amount to concertly move said extension means, diaphragm means and push rod to energize the working end thereof, other means for introducing fluid pressure into said first chamber, said diaphragm means normally being movable in response to fluid pressure in said first chamber to actuate said push rod and energize the working end thereof, and said one piston means being movable towards an operative position to oppose the compressive force of said spring means and movement of said other piston means in the working direction when the fluid pressure in said first chamber is greater than that in said second chamber.

14. A friction device operating mechanism comprising a first housing having a bore therein, an end wall connected with said first housing and having a bore therein, an end plate housing, a diaphragm clamped in sealing engagement between said first housing and end plate housing, a push rod connected with said diaphragm and having a working end extending exteriorly of said end plate housing, a first piston slidable in said housing bore, abutment means limiting movement of said first piston toward said diaphragm, a first expansible chamber in said housing bore between said first piston and diaphragm, a centrally located aperture in said first piston, a second piston slidable in said housing bore, extension means on said second piston slidable in said aperture and said end wall bore, said extension means having a free end in said first chamber normally engaged with said diaphragm, an opposed free end in said end wall bore, a second expansible chamber in said housing bore between said first and second pistons, a first fluid pressure port in said housing connecting with said first chamber, a second fluid pressure port in said housing connecting with said end wall bore, passage means in said extension means connecting said second chamber in pressure fluid communication with said end wall bore, spring means biased between said housing and second piston, said spring means normally urging said second piston in a working direction to concertly move said extension means and diaphragm to actuate said push rod and energize the working end when the fluid pressure in said second port is less than a predetermined amount, said diaphragm being movable in a working direction in response to fluid pressure in said first port to actuate said push rod and energize the working end thereof, and said first piston being movable toward engagement with said second piston to oppose the compressive force of said spring means when the fluid pressure in said first port exceeds that in said second port.

15. A friction device operating mechanism comprising a housing having a bore and an aligned tapered bore therein, a shoulder formed adjacent to the juncture of said housing bore and said tapered bore, a base wall connected to said housing at one end thereof and closing said housing bore, an end plate housing, a cylindrical extension on said base wall extending coaxially into said housing bore, a bore in said cylindrical extension, a diaphragm clamped between said housing at the other end thereof and said end plate housing closing said tapered bore, a push rod connected with said diaphragm and having a working end extending exteriorly of said end plate housing a first piston slidable in said housing bore and normally engaged with said shoulder, a first expansible chamber between said diaphragm and said first piston, a centrally located aperture in said first piston, a second piston slidable in said housing bore, extension means connected with said second piston and slidable in said aperture and in said bore in said cylindrical extension, said extension means havng a free end in said first chamber normally engaged with said diaphragm, a second expansible chamber between said first and second pistons, passage means in said extension means connecting said second expansible chamber with said bore in said cylindrical extension, a first fluid pressure port in said housing connecting with said first chamber, a second fluid pressure port in said housing base wall connecting with said bore in said cylindrical extension, and spring means biased between said base wall and second piston, said spring means normally urging said second piston in a working direction to concertly move said extension and diaphragm to actuate said push rod and energize the working end thereof when the fluid pressure in said second port is less than a predetermined amount, said diaphragm being movable in a working direction in response to fluid pressure in said first port to actuate said push rod and energize the working end thereof, and said first piston being movable toward engagement with said second piston to oppose the compressive force of said spring means when the magnitude of the fluid pressure in said first port acting on one side of said first piston is greater than that in said second port acting on the other side of said first piston.

16. In a brake operating mechanism of the type described, including power means for normally effecting brake actuation in response to operator metered fluid pressure from a source, and resiliently urged means normally rendered inoperative by fluid pressure from said source and adapted to move toward said power means to effect emergency brake actuation upon a predetermined loss of fluid pressure acting thereon, the combination of movable piston means intermediate to said power means and resiliently urged means, means for normally maintaining said piston means in fixed position adjacent to said power means, said piston means being urged to move in response to operator metered fluid pressure to oppose the movement of said resiliently urged means upon said predetermined loss of fluid pressure.

No references cited.